J. G. McCLAUGHRY.
INDEX.
APPLICATION FILED MAR. 27, 1911.

1,011,470.

Patented Dec. 12, 1911.
2 SHEETS—SHEET 1.

Fig. 1.

Fig. 2.

WITNESSES:
Harry W. Davis.
Lula L. Ballvey.

John G. McClaughry  INVENTOR.
BY
Popham & Webster  ATTORNEYS.

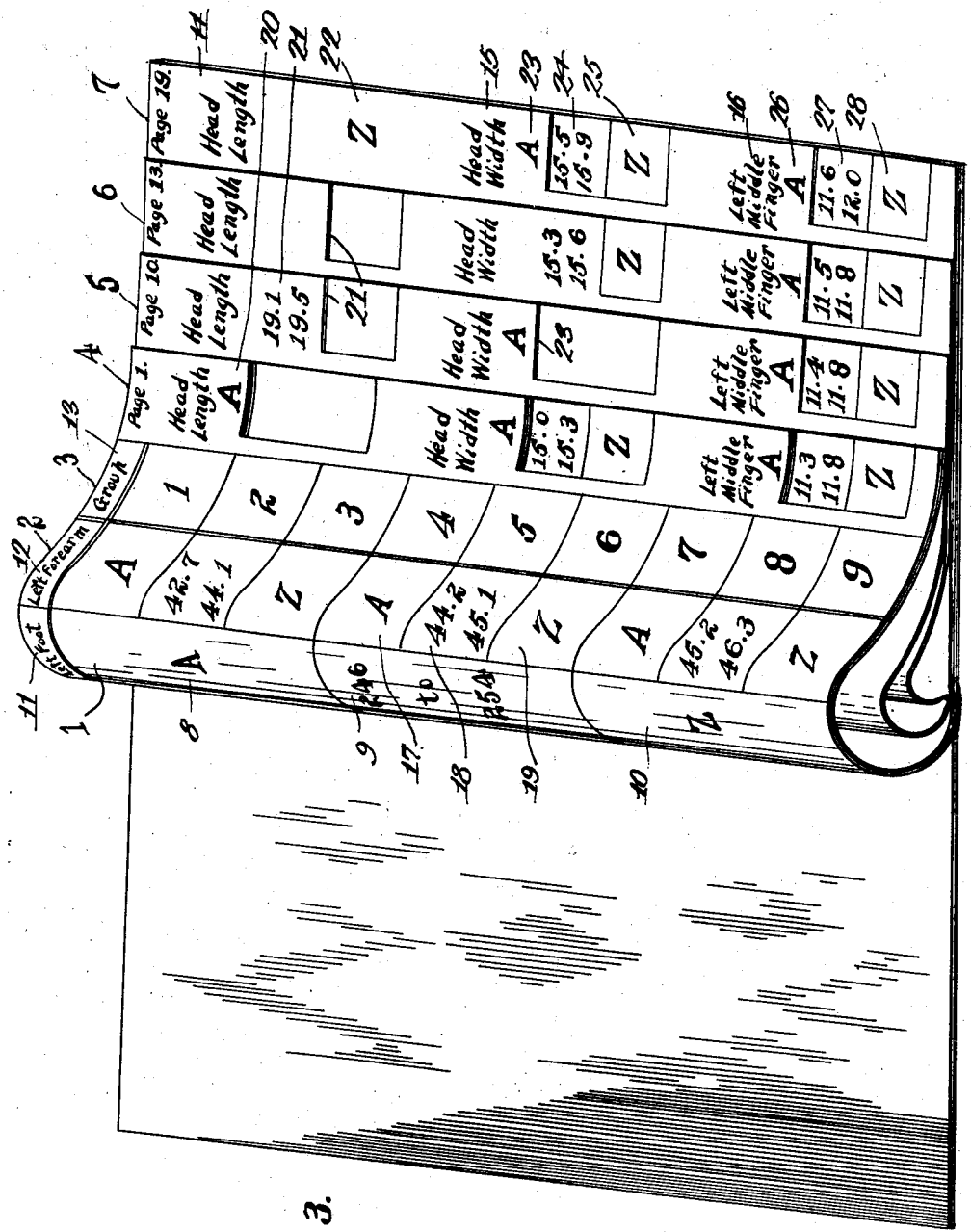

UNITED STATES PATENT OFFICE.

JOHN G. McCLAUGHRY, OF NEW ALBANY, INDIANA.

INDEX.

1,011,470.  Specification of Letters Patent.  Patented Dec. 12, 1911.

Application filed March 27, 1911. Serial No. 617,199.

*To all whom it may concern:*

Be it known that I, JOHN G. MC-CLAUGHRY, a resident of New Albany, in the county of Floyd and State of Indiana, have invented a new and Improved Index, of which the following is a full, clear, and exact description.

The object of the invention is to provide a compact and effective index on a plurality of leaves, especially adapted to a group of variable members in which the members vary independently of one another.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of a book containing my index, opened at page 1. Fig. 2 is a perspective view of the same, opened at page 19. And Fig. 3 is a perspective view of the same showing the side index columns on a number of leaves.

As here illustrated, my invention is embodied in a Bertillon index. The Bertillon system consists in classifying criminals in accordance with five or more measurements, head length, head width, left middle finger, left foot, and left forearm. There are three different grades for each measurement, maximum, medium, and minimum. For purposes of classification, a variation in any one of the five measurements from one grade to another would create a new group. With five objects of measurement and with three grades in each it is evident that the total number of groups would be 243. Therefore in this embodiment of my invention a series of columns 3 is provided on the leaves in which the groups are identified by a series of numbers from 1 to 243 inclusive.

I use the outer column 4, 5, 6, or 7, for the more comprehensive bases of classification, which, in the present embodiment, are head length 14, head width 15, and left middle finger 16. Accordingly at the top of this column on each leaf I place the words "Head length", indicated by the numeral 14. Thereunder, on the first nine pages, I place the letter "A", numbered 20, indicating that on the first nine pages all of the eighty-one groups have a minimum head length. I then cut an insert 20 below the letter "A" in this column through the first nine leaves sufficient to show the designations 21 and 22 under head length. On page 10, and on the succeeding eight pages under the words "Head length" in this outer column, low enough to come within the insert 20, I place designations 21 indicating that all the eighty-one groups from pages 10 to 18 inclusive, have a medium head length. Below this designation I make an insert 21 in this outer column in pages 10 to 18 inclusive, sufficient to show the letter "Z" which is placed under the words "Head length" and referred to as 22 on the last nine pages to indicate that all the eighty-one groups from pages 19 to 27 inclusive have a maximum head length. Below the title "Head length" 14 and its subsidiary titles 20, 21, and 22, in the same vertical column, I place the title "Head width" 15 on each leaf. Below this title I use the same series of three subsidiary titles, referred to as 23, 24, and 25, with the same kind of inserts 23 and 24 as are used under the title "Head length". But each subsidiary title under "Head width" covers one-third the number of pages that is covered by each subsidiary title under "Head length", the series of subsidiary titles under "Head width" being repeated under each subsidiary title under "Head length". The large insert 23 is cut through the first three leaves, the small insert 24 through the second three leaves, the large insert 23 through the fourth three leaves, the small insert 24 through the fifth three leaves, the large insert 23 through the seventh three leaves, and the small insert 24 through the eighth three leaves.

At the bottom of the outer column 4, 5, 6, or 7, on each page or leaf, I place the title "Left middle finger" 16, with a similar series of subsidiary titles 26, 27, and 28, repeated nine times, the entire series being found once under each subsidiary title of "Head width". This makes a variation for "Left middle finger" 16 for every page, and the inserts 26 and 27 are cut through but one leaf at a time.

The next designation is "Left foot" 11, at the head of column 1 on each page. This column is divided into a vertical series of three spaces in which are placed a series of subsidiary titles 8, 9, and 10, similar in purpose to the other subsidiary titles.

The last of the five designations is "Left forearm" 12 at the head of column 2. In this column are three series of subsidiary titles 17, 18, and 19, each series of three titles being placed opposite a single subsidiary title of column 1, and each subsidiary title 17, 18, or 19, being opposite one of the designations in column 3 under the title group 13.

To operate the index, the head length is first ascertained and if it is maximum, the thumb is placed on the letter "Z" referred to as 22 in the upper portion of column 7 and the book opened to page 19. If the head width is medium, the thumb is placed over the designation 24 and the book opened to the page which bears it. If the left middle finger is maximum, or larger than 12.0, the thumb is placed on title 28 and the book opened to the page which bears it. If the left foot is maximum, the user looks down column 1 to the space bearing the designation 10, at the bottom thereof. If the left forearm is minimum, the user looks across column 2 through the space bearing the designation "A" and the group opposite this space in column 3 would be indicated as the group in which the five measurements were combined as just described.

It is evident that my index can be embodied on cards, in a bound book, or in a loose-leaf book. It is also evident that this invention can be used wherever similar principles of indexing are involved and can be varied in many respects without departing from the spirit thereof. Therefore I do not limit myself to the exact form in which my invention is herein disclosed further than is indicated in the claims which follow.

I claim:

1. A three dimension index, comprising a series of columns on a series of leaves having designations identifying the subject matter indexed, one or more series of columns parallel thereto and each having designations affecting the subject matter in said first series of columns opposite thereto, and means along the edges of said leaves for classifying and designating from page to page the subject matter in said first series of columns.

2. An elimination index for a group of variable members in which the members vary independently of one another, comprising a series of columns on a series of leaves having designations for identifying said group for any variation in the combination, a series of columns parallel thereto having designations of the variation of one member, and means on the edges of the pages for showing the variation of a second member from page to page.

3. An elimination index for a group of variable members in which the members vary independently of one another, comprising a series of columns on a series of leaves having designations for identifying said group for any variation in the combination, a series of columns parallel thereto having designations of the variation of one member, a second series of columns parallel thereto having designations of the variation of a second member each embracing transversely all the variations of the first, and means on the edges of the pages for showing the variation of a third member from page to page.

4. An elimination index for a group of variable members in which the members vary independently of one another, comprising a series of columns on a series of leaves having designations for identifying said group for any variation in the combination, a series of columns parallel thereto having designations of the variation of one member, and means on the edges of the pages for showing the variation of a second and a third member from page to page, each variation of said second member embracing all the variations of said third member.

5. An elimination index for a group of variable members in which the members vary independently of one another, comprising a series of columns on a series of leaves having designations for identifying said group for any variation in the combination, a series of columns parallel thereto having designations of the variation of one member, and another series of columns on the edges of the leaves having inserts and designations adapted to show the variation of a second member from page to page.

JOHN G. McCLAUGHRY.

Witnesses:
 LULA L. BALLWEY,
 KATHERINE ARNETT.

Copies of this patent may be obtained for five cents each, by addressing the "Commissioner of Patents, Washington, D. C."